(12) United States Patent
Chen

(10) Patent No.: US 7,685,125 B2
(45) Date of Patent: Mar. 23, 2010

(54) PROVING RELATIONSHIPS BETWEEN DATA

(75) Inventor: Liqun Chen, Stoke Gifford Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/664,466

(22) PCT Filed: Oct. 6, 2005

(86) PCT No.: PCT/EP2005/055040

§ 371 (c)(1),
(2), (4) Date: Sep. 23, 2008

(87) PCT Pub. No.: WO2006/037798

PCT Pub. Date: Apr. 13, 2006

(65) Prior Publication Data
US 2009/0037464 A1 Feb. 5, 2009

(30) Foreign Application Priority Data
Oct. 6, 2004 (GB) ................................. 0422170.1

(51) Int. Cl.
*G06F 17/30* (2006.01)
(52) U.S. Cl. ........................................... 707/9; 726/26
(58) Field of Classification Search ................. 707/9; 726/26
See application file for complete search history.

(56) References Cited

U.S. PATENT DOCUMENTS

| 6,047,242 | A * | 4/2000 | Benson ....................... 702/35 |
| 6,058,188 | A * | 5/2000 | Chandersekaran et al. .. 380/286 |
| 6,249,585 | B1 * | 6/2001 | McGrew et al. ............. 380/286 |
| 6,282,295 | B1 * | 8/2001 | Young et al. ................ 380/286 |
| 6,687,822 | B1 * | 2/2004 | Jakobsson ................... 713/156 |
| 6,889,322 | B1 * | 5/2005 | Levy .......................... 713/168 |
| 6,898,284 | B2 * | 5/2005 | Solinas ........................ 380/28 |
| 7,171,559 | B1 * | 1/2007 | Bao et al. ................... 713/169 |
| 7,213,266 | B1 * | 5/2007 | Maher et al. .................. 726/26 |
| 7,305,392 | B1 * | 12/2007 | Abrams et al. ................. 707/9 |
| 7,353,396 | B2 * | 4/2008 | Micali et al. ................ 713/176 |
| 7,360,080 | B2 * | 4/2008 | Camnisch et al. ........... 713/156 |
| 7,533,419 | B2 * | 5/2009 | Paya et al. .................... 726/26 |
| 2001/0044895 | A1 * | 11/2001 | Hada .......................... 713/168 |
| 2002/0007457 | A1 * | 1/2002 | Neff ........................... 713/180 |
| 2002/0094090 | A1 * | 7/2002 | Iino ............................ 380/282 |
| 2003/0097344 | A1 * | 5/2003 | Chaum et al. ................. 705/75 |
| 2004/0111617 | A1 * | 6/2004 | Patrick ....................... 713/176 |

(Continued)

OTHER PUBLICATIONS

Lee, B., "Zero Knowledge Proofs, Digital Signature Variants, and Their Applications," (2002) Retrieved from the Internet on Feb. 14, 2006: <http//caislab.icu.ac.kr/(sultan)/phdthesis/thesis_bclee.ps>.

*Primary Examiner*—Charles Rones
*Assistant Examiner*—Phuong-Thao Cao

(57) ABSTRACT

A method for a provider to provide and prove an association between a first data value A and a second data value B, including: computing evidence E of the form $$E = H(A\|B)^{k*(p-1)/q} \bmod p,$$

where H is a secure hash function, E is an evidence of an association between A and B; ensuring that the verifier has A, B and E; and running an interactive proof with the verifier to convince the verifier that the evidence is valid and that the provider knows the value of k without disclosing the value of k to the verifier.

21 Claims, 5 Drawing Sheets

U.S. PATENT DOCUMENTS

2005/0038755 A1* 2/2005 Silverbook et al. ............ 705/67
2005/0149538 A1* 7/2005 Singh et al. ................. 707/100
2008/0301430 A1* 12/2008 Bradley et al. .............. 713/150

* cited by examiner

PROVING RELATIONSHIPS BETWEEN DATA

FIELD OF THE INVENTION

The invention relates to the proving of relationships between data.

BACKGROUND TO THE INVENTION

Circumstances arise when there is an association between two or more pieces of data, and the association is sufficiently sensitive that some form of privacy control is needed in respect of the association. This typically requires placing privacy controls on at least one of the pieces of data. Maintaining such privacy controls—particularly if the association is merely one of many similar associations—may be very onerous.

SUMMARY OF THE INVENTION

In a first aspect, the invention provides a method for a data provider to provide and prove an association between a first data value A and a second data value B, comprising: computing evidence E of an association between A and B; ensuring that the verifier has A, B and E; and running an interactive proof with the verifier to convince the verifier that the evidence is valid evidence of an association between A and B without enabling the verifier to provide proof of the validity of the evidence to a third party.

DESCRIPTION OF DRAWINGS

Specific embodiments of the invention will now be described, by way of example, with reference to the accompanying drawings, of which.

DESCRIPTION OF SPECIFIC EMBODIMENTS

Figure 1:
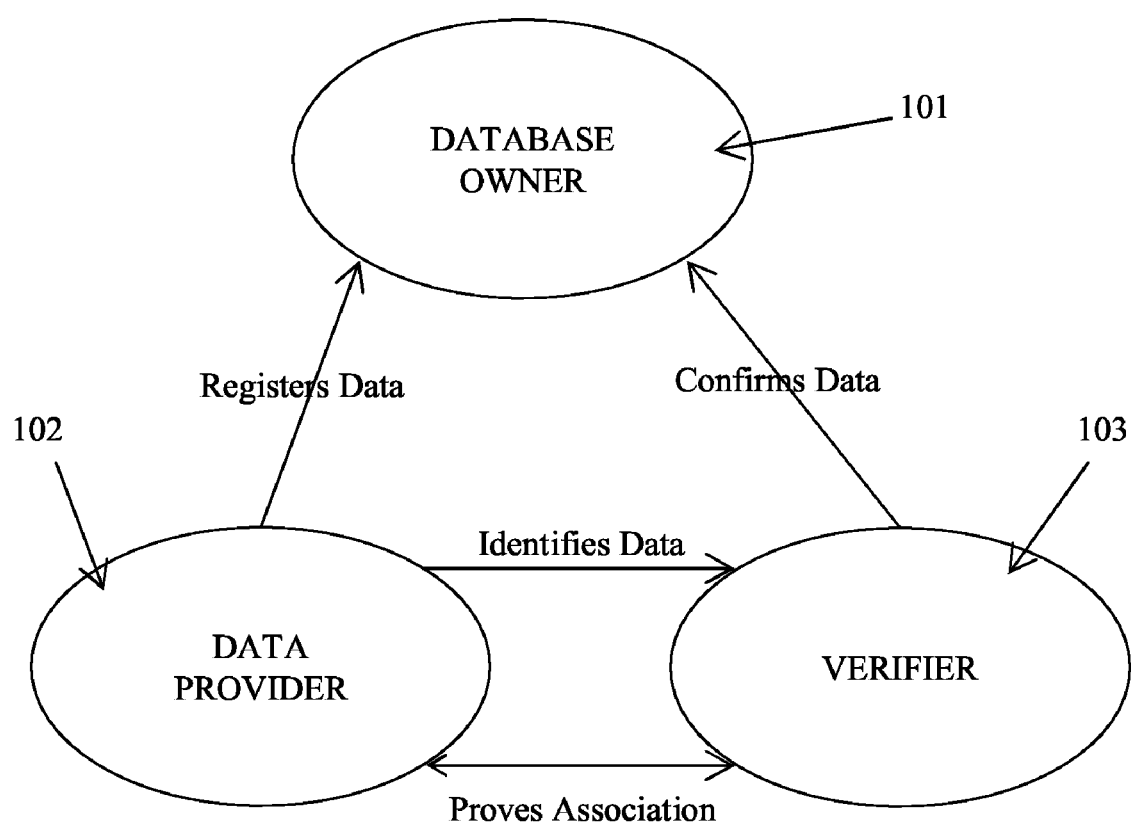
FIG. 1 shows a relationship between parties providing a context in which embodiments of the invention may be used.

FIG. 1 shows a context relevant for application of embodiments of the invention. FIG. 1 represents three parties and their relationships and interactions. A database owner 101 maintains a database which holds public data. The database owner 101 is trusted to hold reliable data by users of the database. Data in the database is submitted to the database owner for entry by data providers 102. A data provider 102 provides first data and second data, and also third data which provides evidence of an association between the first data and the second data, this data being registered with the database owner 101 and entered onto the database. The database contains no indication of any relationship between any of the first data, the second data and the third data. A verifier 103 wishes to establish whether there is an association between the first data and the second data (having learned at least one of these data from another source) and contacts the data provider. The data provider 102 enables the verifier 103 to check that the first data, second data and third data are all held in the database. The data provider 102 then interacts with the verifier 103 to prove that the third data evidence shows an association between the first data and the second data, but without enabling the verifier 103 to be able to transfer this proof to others. The verifier 103 may be able to convince third parties of the association, but only by virtue of the third parties trusting the verifier 103 as the proof cannot be transferred.

This context may be relevant where the first data represents a name of a product vendor and the second name represents a data value identifying product produced by that product vendor. In one example, these products are computational components used for trusted computing (such as the trusted platform module or TPM as specified by the Trusted Computing Group). A computer platform may ship with one of several components that perform the same trust function, or dynamically provide the option to use one of multiple components that perform the same trust function. If a component can identify itself via a number, the platform can customise itself according to the idiosyncrasies of the component actually fitted and/or in use. Thus using the numbers provides the opportunity for a platform to be built to use components from multiple vendors, for example, and software could automatically adapt to the particular component that was fitted.

Such vendors may wish to preserve their anonymity in general yet be able to prove an association with a number when/if necessary. A database constructed in the manner indicated above allows this to be achieved. The database is publicly available. The database does not disclose the link between a specific name and a specific number, even though all of the vendor's names, numbers and the evidence linking them appear in the database at the same time (the effectiveness of the anonymity that this provides is limited by the size of the database). The database owner himself need not be aware of any linkage between A, B and E—this can simply be forgotten after A, B and E are loaded into the database. A vendor, who is the owner of a specific name and number, can prove the link between the name and number to any verifier in a private matter. Except for the vendor, no one else is able to prove the link between the name and number. After the vendor proves a link to a verifier, the verifier is convinced of the proof but is not able to transfer his knowledge of the proof to a third party.

Figure 2:
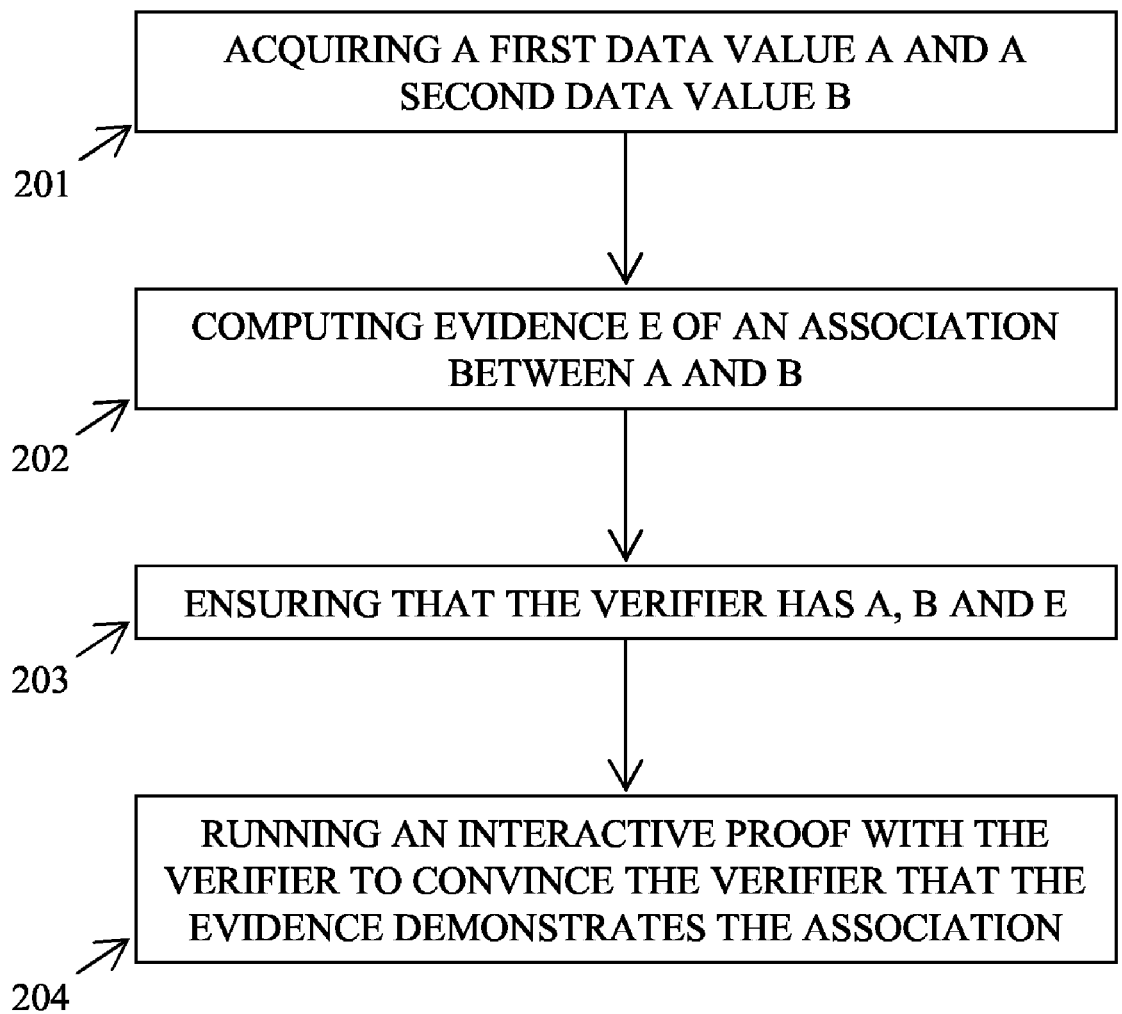
FIG. 2 shows a method for a provider to provide and prove an association between a first data value A and a second data value B according to an embodiment of the invention.

Steps carried out by the data provider—product vendor in this example—are set out in FIG. 2. The first data value A and the second data value B are acquired 201—these could be generated by the data provider himself, or by agreement with the database provider. The data provider then computes 202 evidence E of an association between the first data value A and the second data value B. These are placed in the database by the database owner (who is first satisfied that the evidence does indeed demonstrate the association). When a verifier appears requiring proof of the association, the data provider ensures 203 that the verifier knows the relevant values of A, B and E—which the verifier can check in the database to confirm that they are a possible related set of values—and then runs 204 an interactive proof with the verifier to convince the verifier that the evidence does indeed demonstrate the association.

Two exemplary schemes are described to implement this approach. Both exemplary schemes have an initial setup algorithm ("Setup"), followed by a registration protocol ("Register") and a proof protocol ("Prove"), the elements of each being set out in FIGS. 3, 4 and 5 respectively.

EXAMPLE 1

Figure 3:
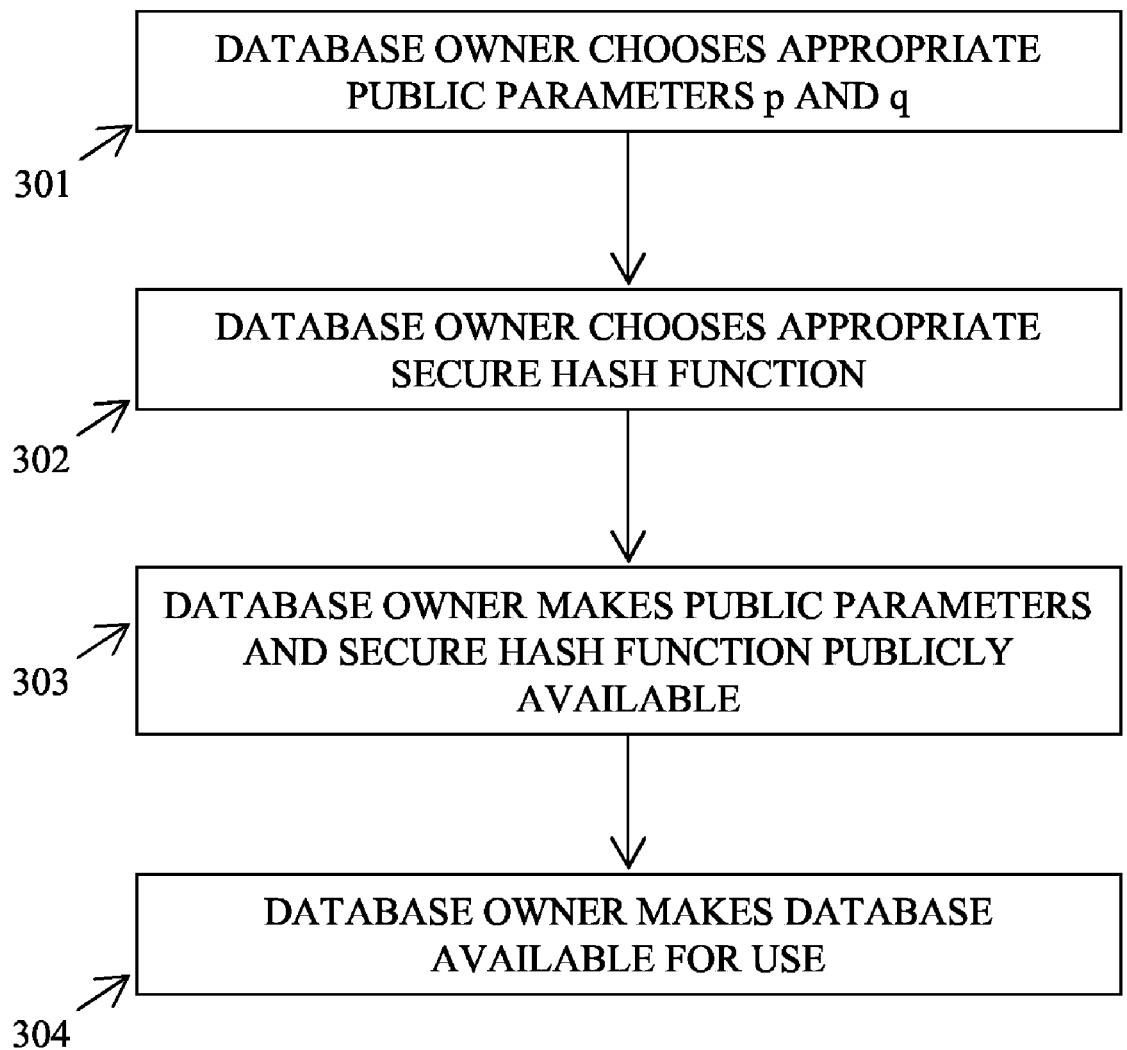
FIG. 3 shows the elements of an algorithm for setting up a database for holding data values in accordance with an embodiment of the invention.

Setup is discussed with reference to FIG. 3. To setup the database, the database owner does the following. He first chooses (301) two public parameters p and q, such that both p and q are large primes and q|(p−1) (corresponding to (p−1)/q is an integer). A recommended (but not limited) size of p is at least 1024-bit and the size of q is 160-bit. He then chooses (302) a highly secure hash function, H, such as SHA-1. He then makes (303) the primes and hash function identifier publically available. At this point, the database can be made available (304) for use.

Register

Figure 4:
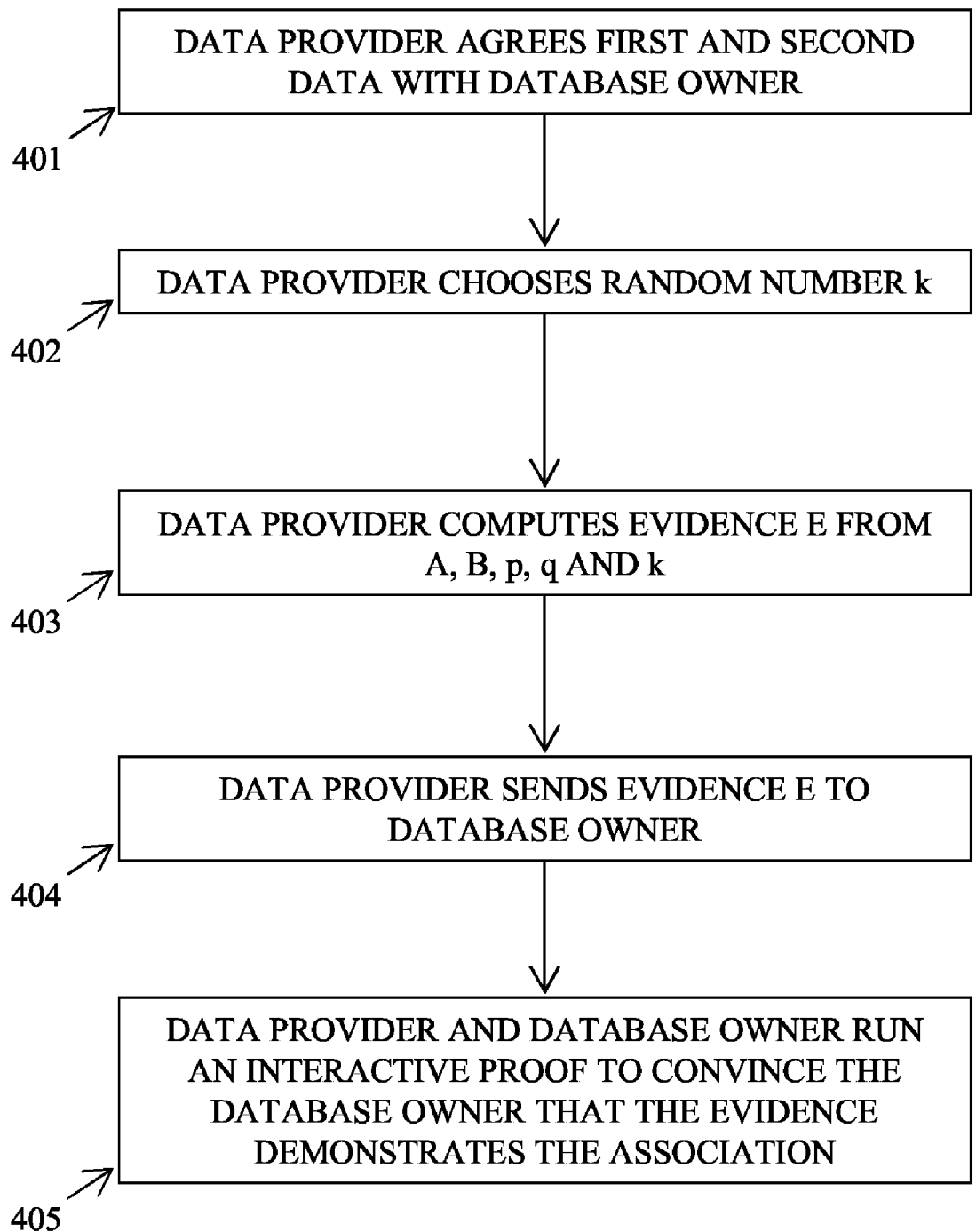
FIG. 4 shows the elements of a protocol for registering data in the database set up as in FIG. 3 in accordance with an embodiment of the invention.

This is shown in FIG. 4. When a data provider registers itself with the database owner for the purpose of adding information of the data provider into the database, the data provider and the database owner first negotiate 401 a name A and a random number B for the data provider. Both name and number are unique and have selected sizes (for example, that A is at most 20 bytes and B is a fixed 16 bits). The scheme proposed here does not limit the size of a name string or a number string. Authentication between the database provider and the database owner would be expected in most practical arrangements implementing this approach—this is outside the scope of the present protocol, however.

Based on the agreed name and number, the data provider performs as follows:

Chooses 402 a random number k∈]1, q−1].
Computes a base value $$g=H(A\|B)^{(p-1)/q} \bmod p,$$

where A∥B denotes concatenation between A and B.

Computes 403 evidence $$E=g^k \bmod p.$$

Stores k in secret.
Optionally, stores g. (The alternative is to re-compute g every time needed).
Sends 404 E to the database owner.

The database owner and the data provider then interact 405 as follows to convince the database owner that the evidence E demonstrates an association between A and B. Upon receipt of the evidence E, the database owner performs as follows:

Chooses a random number a∈]1, q−1].
Computes a challenge $$C=H(A\|B)^{a*(p-1)/q} \bmod p.$$

Sends C to the data provider.
Upon receipt of the value C, the data provider performs as follows:

Chooses a random number b∈]1, q−1].
Computes a response $$D=C^{k}*H(A\|B\|3)^{b*(p-1)/q} \bmod p.$$

(it should be noted that instead of 3, any other convenient non-zero value can be used).
Send D to the database owner.
Upon receipt of the value D, the database owner releases a to the data provider.
Upon receipt of the value a, the data provider performs as follows:

Checks if $$C=g^a \bmod p$$

holds.
If the check fails, aborts the protocol.
Otherwise releases the value b to the database owner.

Upon receipt of the value b, the database owner performs as follows:

Checks if $$D=E^{a}*H(A\|B\|3)^{b*(p-1)/q} \bmod p$$

holds.
If the check fails, rejects the evidence E.
Otherwise publishes A, B and E in the database.

Prove

Figure 5:
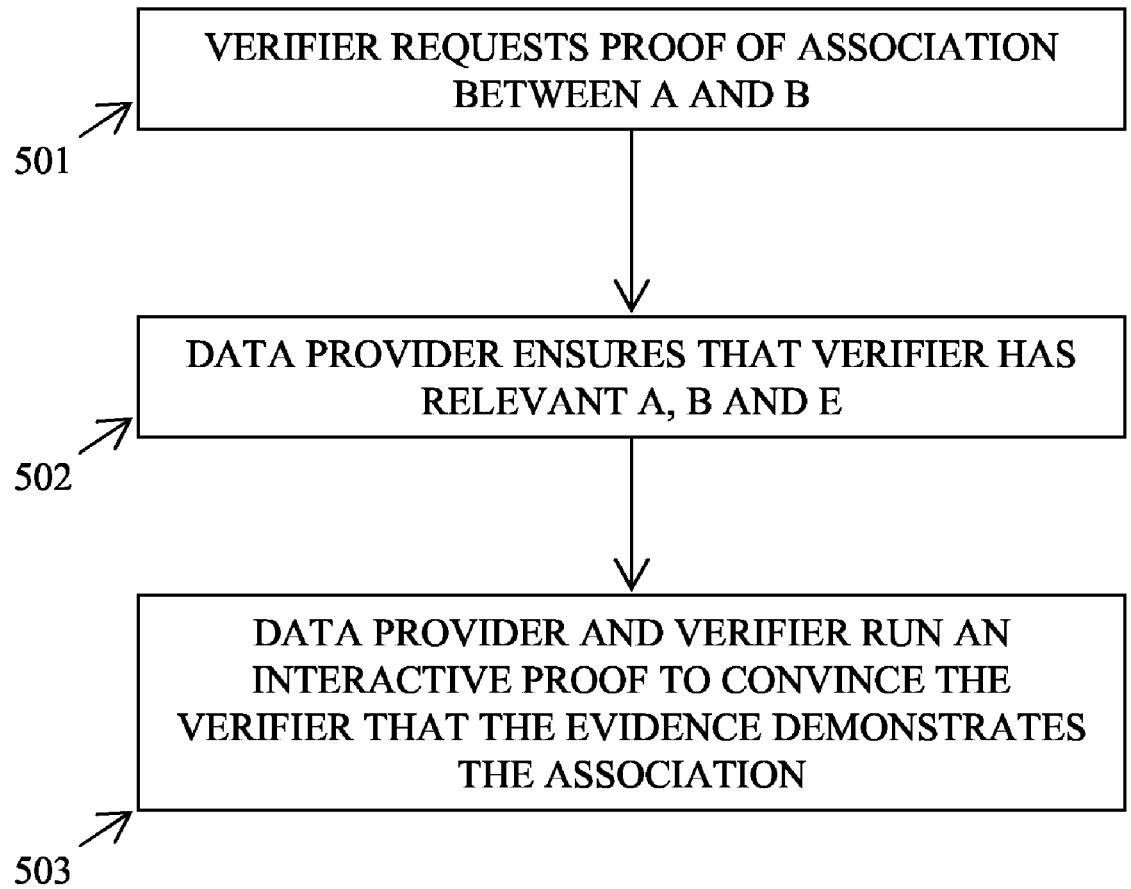
FIG. 5 shows the elements of a protocol for proving the link between a first data value A and a second data value B held in the database set up as in FIG. 3 in accordance with an embodiment of the invention.

This is shown in FIG. 5. When a data provider needs to prove the link between A and B to a verifier, the data provider first indicates his A, B and E to the verifier (the verifier will generally know B—in the case of a trusted component discussed above, the value may be held as an identifier on the trusted component). Then the data provider convinces the verifier of the evidence. This part is very similar to the register protocol.

The verifier first performs as follows:
Chooses a random number x∈]1, q−1].
Computes a challenge $$U=H(A\|B)^{x*(p-1)/q} \bmod p.$$

Sends U to the data provider.
Upon receipt of the value U, the data provider performs as follows:

Chooses a random number y∈]1, q−1].
Computes a response $$V=U^{k}*H(A\|B\|4)^{y*(p-1)/q} \bmod p.$$

(As for D in the register protocol, it should be noted that instead of 4, any other convenient non-zero value can be used).
Sends V to the verifier.
Upon receipt of the value V, the verifier releases x to the data provider.
Upon receipt of the value x, the data provider performs as follows:

Checks if $$U=g^x \bmod p$$

holds.
If the check fails, aborts the protocol.
Otherwise releases the value y to the verifier.
Upon receipt of the value b, the verifier performs as follows:

Checks if $$V=E^{x}*H(A\|B\|4)^{y*(p-1)/q} \bmod p$$

holds.
If the check fails, rejects the proof.
Otherwise accepts the proof.

EXAMPLE 2

Setup

Reference can again be made to FIG. 3. As for Example 1, to setup the database, the database owner does the following. He first chooses (301) two public parameters p and q, such that both p and q are large primes and q|(p−1) (corresponding to (p−1)/q is an integer). A recommended (but not limited) size of p is at least 1024-bit and the size of q is 160-bit. He then chooses (302) a highly secure hash function, H, such as SHA-1. He then makes (303) the primes and hash function identifier publically available. At this point, the database can be made available (304) for use.

Register

Reference can again be made to FIG. 4. As for Example 1, when a data provider registers itself with the database owner for the purpose of adding information of the data provider into the database, the data provider and the database owner first negotiate 401 a name A and a random number B for the data provider. Both name and number are unique and have selected sizes (for example, that A is at most 20 bytes and B is a fixed 16 bits). The scheme proposed here does not limit the size of a name string or a number string. Authentication between the database provider and the database owner would be expected in most practical arrangements implementing this approach—this is outside the scope of the present protocol, however.

Based on the agreed name and number, the vendor performs as follows:

Chooses 402 a random number $k \in ]1, q-1]$.
Computes 403 evidence $$E = H(A\|B)^{k^*(p-1)/q} \bmod p,$$

where $A\|B$ denotes concatenation between A and B.
Sends 404 E to TCG.
Stores k in secret.
After receiving the evidence E, TCG computes $$g = H(A\|B)^{(p-1)/q} \bmod p.$$

TCG and the vendor then run 405 an interactive Discrete Logarithm Proof (DLP) protocol namely DLP(p, g, E) to convince TCG that $E = g^k \bmod p$ and the vendor has knowledge of the value k.

There exist a number of secure protocols to achieve such a function. One such is described in D. Chaum, "Zero-knowledge undeniable signatures", in Advances in Cryptology—Proceedings of Crypto '90, Lecture Notes in Computer Science 473, pages 458-464, Springer-Verlag, 1991. This protocol will be referred to as DLP(p,g,E) and involves two parties, Prover and Verifier.

Prover and Verifier share the values p, g and E. Prover knows the discrete logarithm $k = \log_g E$. Prover wants to convince Verifier of Prover's knowledge of this value, but (i) does not want to disclose the value k to Verifier, and (ii) does not want Verifier to convince others of this fact after the proof.

DLP(p, g, E) works as follows:
1. Verifier randomly chooses $a \in ]1, q-1]$, computes $X = g^a \bmod p$, and sends X to Prover.
2. Prover randomly chooses $b \in ]1, q-1]$, computes $Y = X^* g^b \bmod p$ and $Z = Y^k \bmod p$, and then sends Y and Z to Verifier.
3. Verifier releases the value a to Prover.
4. Prover checks if $X = g^a \bmod p$ holds. If the check fails, Prover aborts the protocol. Otherwise Prover releases the value b to Verifier.
5. Verifier checks if both $Y = X^* g^b \bmod p$ and $Z = E^a * E^b \bmod p$ hold. If any of these checks fails, Verifier rejects the proof. Otherwise Verifier accepts the proof.

Prove

This is again shown in FIG. 5. When a data provider needs to prove the link between A and B to a verifier, the data provider first indicates his A, B and E to the verifier (the verifier will generally know B—in the case of a trusted component discussed above, the value may be held as an identifier on the trusted component). Then the data provider convinces the verifier of the evidence. This is achieved in a similar way to the register protocol.

More specifically, the verifier computes $$g = H(A\|B)^{(p-1)/q} \bmod p.$$

The vendor and verifier then run a DLP protocol DLP(p, g, E) to prove that E is evidence of the link between A and B exactly as shown above in respect of the Register protocol.

The exemplary arrangements described above in Examples 1 and 2 apply to the general case where the vendor, the verifier and the database owner are separate parties. Where, as is possible, the vendor is also the database owner, some simplification is possible (at the register step, for example).

Examples 1 and 2 given above have a product vendor as data provider and a verifier as a party needing knowledge of a relationship between a name of a product vendor and a data value identifying product produced by that product vendor. The present invention may be applied to a number of other contexts, as is discussed briefly below. The schemes used in Examples 1 and 2 can be used without significant adaptation in these further contexts.

Further contexts for use of the invention generally require there to be a benefit to providing information for which there are privacy concerns on a public database. The benefit will generally be to show that the data is demonstrably not modified (in that it will be available to public inspection—and perhaps copying—so modification will be readily determined) and perhaps also to indicate that a reliable party demonstrates provenance of it. There will generally also be a need for a party which has privacy concerns over data in the database to show the relationship to a specific interested party.

Academic Records Many universities may wish to make student performance, such as the individual exam results, publicly accessible (for example, from the university website) so that performance can be checked and audited. Individual examination results of a student will however generally be private to that student. However, in some particular cases, such as when a student is looking for a job, the student might have to show his potential employer his examination results. If the approach described above is used, with student as data provider (or university, authorised by the student, as data provider), with the employer as verifier, and with the university as database owner, privacy concerns are met. The employer may find this arrangement more satisfactory than relying on the student's statements about examination results (as would most normally be the case at present).

Citizenship Data Personal information of citizens is routinely used by national authorities and is recorded on documents such as national identity cards. While a citizen may be required to provide such information (indeed the providing of information may be taken out of their control), for other purposes it may be left to the citizen to determine whether they use such information. For such purposes, private data of citizens could be provided on a public database (the private data may be, for example, some credential of the individual, such as their driving license number). The citizen would then be the data provider, a state organisation (for example, the driving license authority) the database provider, and a party desirous of proving the linkage between the citizen and the credential (for example, a potential insurer) the verifier. This may allow a verification model which enabled the state to play no active role in authenticating credentials beyond simply making the public database available.

The invention claimed is:
1. A method for a data provider to provide and prove an association between a first data value A and a second data value B, comprising:
  computing, by a computer, evidence E of an association between A and B;
  ensuring, by the computer, that a verifier has A, B and E; and running, by the computer, an interactive proof with the verifier to convince the verifier that the evidence is valid evidence of an association between A and B without enabling the verifier to provide proof of the validity of the evidence to a third party, wherein the evidence E is of the form $$E=H(A\|B)^{k*(p-1)/q} \bmod p,$$

where H is a secure hash function, k is a random number, p is a first prime, and q is a second prime, and wherein in running the interactive proof the provider convinces the verifier that the provider knows the value of k without disclosing the value of k to the verifier.

2. The method as claimed in claim 1, further comprising placing A, B and E on a database maintained by a database owner trusted by the verifier.

3. The method as claimed in claim 1, wherein the first data value A and the second data value B are agreed between the provider and the database owner.

4. The method as claimed in claim 1, further comprising placing A, B and E on a database maintained by a database owner trusted by the verifier and wherein the provider runs an interactive proof with the database owner to convince the database owner that the provider knows the value of k without disclosing the value of k to the database owner.

5. The method as claimed in claim 1, where the interactive proof is a discrete logarithmic proof.

6. The method as claimed in claim 1, wherein a first data value A is or represents a product vendor and a second data value B is or represents a data value identifying product produced by the product vendor.

7. The method as claimed in claim 1, wherein a first data value A is or represents an individual and a second data value B is or represents data private to that individual.

8. The method as claimed in claim 7, wherein the second data value B is or represents examination results.

9. The method as claimed in claim 7, wherein the second data value B is or represents a credential of the individual.

10. The method as claimed in claim 1, wherein (p−1)/q is an integer value.

11. A method for a database owner to maintain a database, comprising:
  obtaining, by a computer, associated first data values A and second data values B from data providers;
  obtaining, by the computer, evidence E from the data providers for each associated first data values A and second data values B;
  confirming, by the computer, that the evidence E has been validly generated from the respective first data value A and the respective second data value B in an interactive proof with the data providers; and
  making each first data value A, second data value B and evidence E publicly available in the database without indicating any relationship between A, B and E,
  wherein the evidence E is generated according to the relation $$E=H(A\|B)^{k*(p-1)/q} \bmod p,$$

where H is a secure hash function, k is a random number, p is a first prime, and q is a second prime, and wherein in running the interactive proof the data providers convince a verifier that the data providers know the value of k without disclosing the value of k to the verifier.

12. The method as claimed in claim 11, further comprising choosing and making public the first prime p, the second prime q and the secure hash function H, and confirming that the evidence E has been validly generated using the first prime p, the second prime q, and the secure hash function H.

13. The method as claimed in claim 11, wherein first data values A and second data values B are agreed between the database owner and the respective data providers.

14. The method as claimed in claim 11, wherein (p−1)/q is an integer value.

15. A database system comprising:
  a computer memory storing first data values A, second data values B and evidence E validly generated from first data values A and second data values B in a database, wherein the database providing no indication of the relationship between A, B and E;
  means for providing A, B and E to a verifier; and
  means for running an interactive proof to allowing a party who has generated evidence E to prove to the verifier that E is valid evidence of an association between A and B without allowing the verifier to provide proof of the validity of the evidence to a third party,
  wherein the evidence E is generated according to the relation $$E=H(A\|B)^{k*(p-1)/q} \bmod p,$$

where H is a secure hash function, k is a random number, p is a first prime, and q is a second prime, and
  wherein in running the interactive proof a provider convinces the verifier that the provider knows the value of k without disclosing the value of k to the verifier.

16. The database system as claimed in claim 15, wherein the information published with the database comprises a first prime p, a second prime q and a secure hash function H.

17. The database system as claimed in claim 15, wherein a first data value A is or represents a product vendor and a second data value B is or represents a data value identifying product produced by the product vendor.

18. The database system as claimed in claim 15, wherein a first data value A is or represents an individual and a second data value B is or represents data private to that individual.

19. The database system as claimed in claim 18, wherein the second data value B is or represents examination results.

20. The database system as claimed in claim 18, wherein the second data value B is or represents a credential of the individual.

21. The database system as claimed in claim 15, wherein (p−1)/q is an integer value.

* * * * *